(12) United States Patent
Ang et al.

(10) Patent No.: US 6,641,304 B1
(45) Date of Patent: Nov. 4, 2003

(54) UNIVERSAL HOSE

(75) Inventors: Jonathia Ang, Hamilton (BM); Randall Richardson, Suwanee, GA (US); Paul Schmidt, Sugar Hill, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/697,572

(22) Filed: Oct. 26, 2000

(51) Int. Cl.⁷ ................................................ G01K 1/14
(52) U.S. Cl. ...................... 374/147; 374/141; 374/166; 236/93 R
(58) Field of Search ................................ 374/141, 147, 374/185, 179, 148, 166; 439/913; 236/93 R, 99 E, 80 C

(56) References Cited

U.S. PATENT DOCUMENTS

| | | | |
|---|---|---|---|
| 2,957,153 A | * 10/1960 | Greenberg | 338/28 |
| 4,129,848 A | * 12/1978 | Frank et al. | 204/192.23 |
| 4,272,466 A | * 6/1981 | Harris | 264/40.6 |
| 4,336,708 A | * 6/1982 | Hobgood et al. | 374/5 |
| 4,369,505 A | * 1/1983 | Carruth, Jr. | 367/13 |
| 4,600,124 A | * 7/1986 | Price | 219/230 |
| 4,671,675 A | * 6/1987 | Arisi et al. | 136/233 |
| H381 H | * 12/1987 | Pounds et al. | 374/142 |
| 4,819,655 A | * 4/1989 | Webler | 600/526 |
| 5,195,976 A | * 3/1993 | Swenson | 604/113 |
| 5,353,873 A | * 10/1994 | Cooke, Jr. | 166/64 |
| 5,752,931 A | * 5/1998 | Nazarian et al. | 604/67 |
| 5,837,944 A | * 11/1998 | Herot | 177/245 |
| 5,974,227 A | * 10/1999 | Schave | 392/472 |
| 6,049,658 A | * 4/2000 | Schave et al. | 219/426 |
| 6,290,717 B1 | * 9/2001 | Philips | 607/113 |

OTHER PUBLICATIONS

Nordson Corporation,*Advanced–Technology RTD Hot Melt Hoses*, Brochure, 1996.

* cited by examiner

*Primary Examiner*—Diego Gutierrez
*Assistant Examiner*—Lydia M. DeJesús
(74) *Attorney, Agent, or Firm*—Wood, Herron & Evans, LLP

(57) ABSTRACT

A hose for carrying liquid, such as hot melt adhesive, within a predetermined elevated temperature range. The hose includes a tube or body portion which has an inlet end adapted to connect to a source of liquid, such as a supply tank, and a discharge end adapted to a connect to a liquid dispensing apparatus, such as an adhesive dispensing gun. At least two temperature sensing devices, each having an output end, are also operatively associated with the tube to sense the temperature of the liquid therein. An adapter has a first end selectively connected to the output end of the first temperature sensing device. The adapter also has a second end adapted to connect to a controller which is compatible with the first temperature sensing device and not the second temperature sensing device. With the first temperature sensing device connected to the adapter, it is operative to sense the temperature of the liquid in the tube. In contrast, because the second temperature sensing device is not connected to the adapter, it is inactive and provides no temperature information concerning the liquid in the tube. The hose further includes a second adapter which is capable of replacing the first adapter.

8 Claims, 3 Drawing Sheets

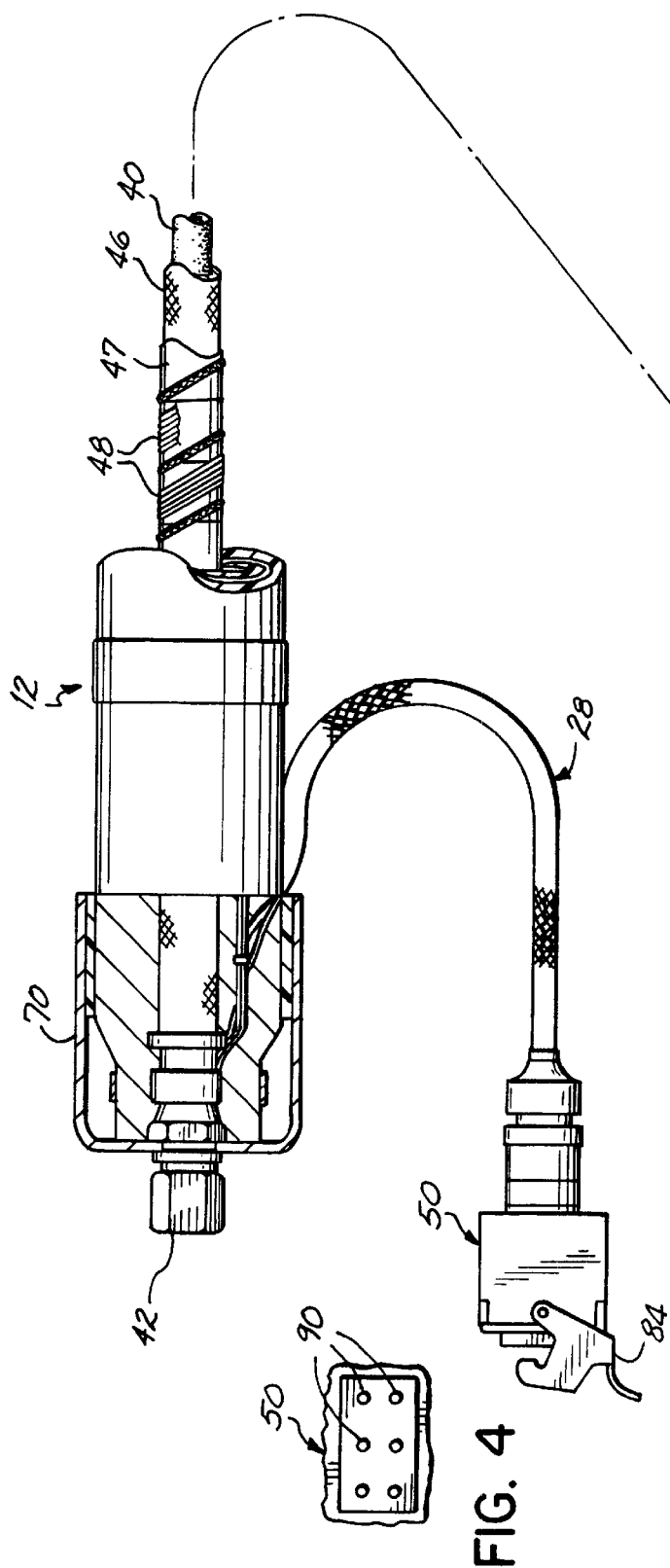
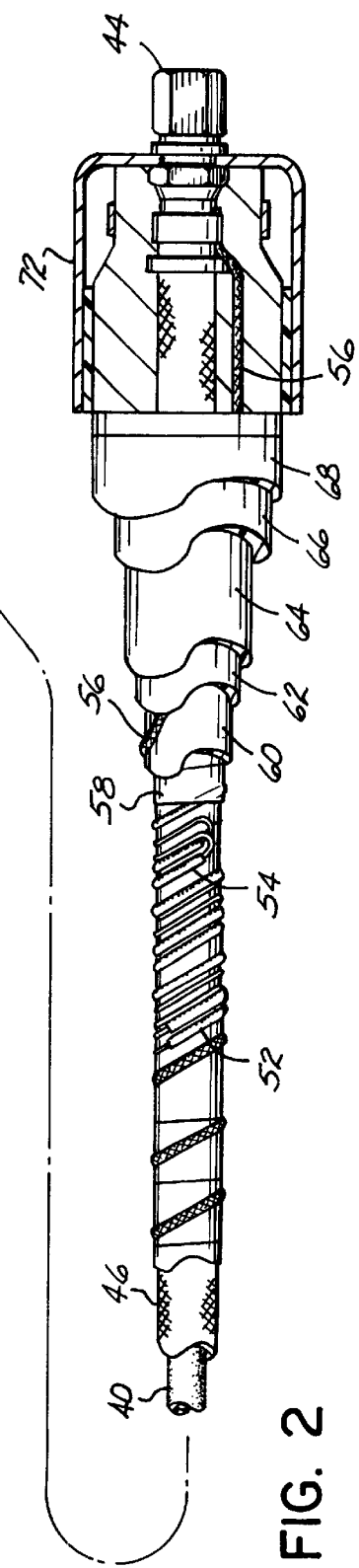
FIG. 4
FIG. 2

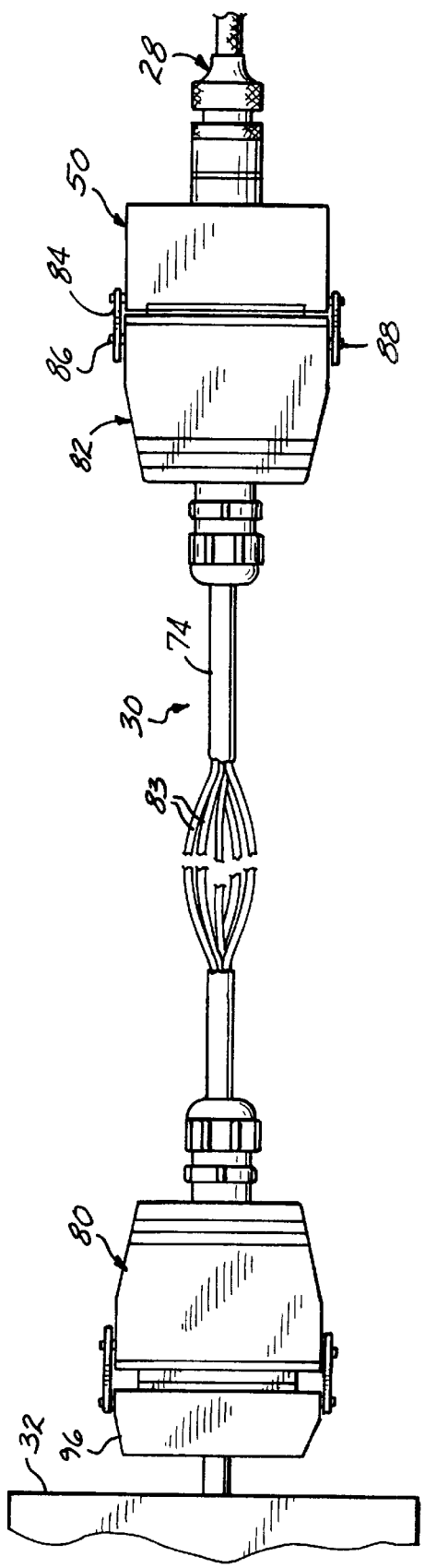
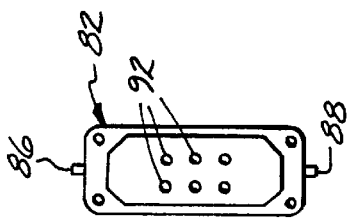
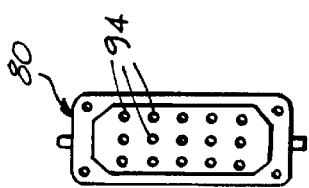
FIG. 3
FIG. 5
FIG. 6

UNIVERSAL HOSE

FIELD OF THE INVENTION

The present invention generally relates to hoses for carrying heated liquids, such as hot melt adhesives.

BACKGROUND OF THE INVENTION

Various manufacturing processes involve the transmission of a heated liquid from a supply tank, through a hose, and to a liquid dispensing device which deposits the heated liquid into a container or onto a substrate. Some of the heated liquids are hot melt adhesives which solidify at room temperature. Accordingly, a hot melt adhesive must be heated and thus liquified so it can flow from the supply tank, through the hose, and out the liquid dispensing device. To liquify and subsequently maintain the hot melt adhesive within an appropriate temperature range, the supply tank, the hose, and the dispensing gun are selectively heated by individual heating devices operatively associated with each respective component. To monitor the temperature of the hot melt adhesive throughout the application process, each component further includes some form of temperature sensing device which operates in conjunction with at least one heating device. A controller operates the heating device in response to signals from the temperature sensing device to maintain the hot melt adhesive within a predetermined temperature range.

Generally, separate temperature controllers are provided for the dispensing gun, the hose, and the supply tank. The hose will often incorporate a single temperature sensing device and a single heating device which are coupled to a wire harness extending from one end of the hose. This wire harness has a connector which connects to a complementary connector on the controller. The controller monitors the temperature detected from the temperature sensing device and activates the heating device as necessary. If the hose becomes clogged or otherwise damaged, any replacement hose must have an appropriate wire harness to fit the complementary connector of the controller.

In addition, care must be taken when replacing a pre-existing hose with a replacement hose as the single temperature sensing device in the replacement hose must be compatible with the controller used with the prior temperature sensing device in the pre-existing hose. For example, one particular temperature sensing device is a resistance temperature detector (RTD) which may be made from different materials, such as nickel or platinum. A nickel RTD must be connected to a controller compatible with a nickel RTD. If the RTD in the replacement hose is not matched to the appropriate, material-specific controller, the controller will provide erroneous temperature information about the hot melt adhesive in the hose and may cause the heating device to operate at dangerously high output levels based on the erroneous temperature information. Thus, a pre-existing hose having a nickel RTD must be replaced by a hose also having a nickel RTD in order that the pre-existing controller will remain compatible with the nickel RTD.

Occasionally, a change in the manufacturing process will require dispensing a different heated liquid at a substantially higher or lower temperature range than that used for a prior heated liquid. In this situation, the prior temperature sensing device in the heated hose may not be suited for measuring those higher or lower temperatures. Because the heated hose includes only a single temperature sensing device, the heated hose must be replaced by a different heated hose having a different temperature sensing device suited for measuring the different liquid temperatures. If a different temperature sensing device is used, the existing controller must also be changed to match the different temperature sensing device. A controller may also have to be replaced if it becomes damaged or inoperative. Unfortunately, if the replacement controller has a connector which does not match the connector of the wire harness on the hose, the user must install a new hose with the appropriate connector. Thus, a manufacturer must maintain a large inventory of heated hoses and controllers to accommodate different manufacturing processes.

In light of the drawbacks discussed above, it would be desirable to provide a heated hose for connecting a supply tank to a liquid dispensing unit where the heated hose incorporates a plurality of different types of temperature sensing devices, such as RTDs made of different materials or thermocouples. It would also be desirable if the heated hose had an adapter cable which was configured to connect the wire harness of the hose to the controller. As such, the single hose could be used with a variety of different controllers configured to operate with the plurality of different temperature sensing devices and only the adapter cable would have to be modified or replaced as opposed to the entire hose.

SUMMARY OF THE INVENTION

The present invention is directed to a hose which overcomes the drawbacks associated with previous heated hoses connecting supply tanks to liquid dispensing devices. The hose includes a tube or body portion which has an inlet end adapted to connect to a source of liquid, such as a supply tank, and a discharge end adapted to a connect to a liquid dispensing apparatus, such as an adhesive dispensing gun. At least two temperature sensing devices, each having an output end, are also operatively associated with the tube to sense the temperature of the liquid therein. An adapter has a first end selectively connected to the output end of the first temperature sensing device. The adapter also has a second end adapted to connect to a controller which is compatible with the first temperature sensing device and not the second temperature sensing device. With the first temperature sensing device connected to the adapter, it is operative to sense the temperature of the liquid in the tube. In contrast, because the second temperature sensing device is not connected to the adapter, it is inactive and provides no temperature information concerning the liquid in the tube.

In one embodiment, the temperature sensing devices are RTDs with at least one RTD constructed of platinum and at least one RTD constructed of nickel. However, the temperature sensing devices could also be thermocouples or any other suitable temperature sensing device. In addition to having only one type of temperature sensing device per hose, the hose could include a combination of different types of temperature sensing devices, such as a mix of RTDs and thermocouples on the same hose.

In one aspect of the invention, the hose includes a wire harness which has a connector coupled to the output ends of the first and second temperature sensing devices. The adapter is connected to the connector such that only one of the first and second temperature sensing devices is active while the other temperature sensing device is inactive.

In another aspect of the invention, the hose includes a second adapter which is capable of replacing the first adapter. Like the first adapter, the second adapter has first and second ends. However, the first end of the second adapter is selectively connected to the output end of the second temperature sensing device, not the first temperature sensing device. The second end is adapted to connect to a controller compatible with the second temperature sensing device, but not the first temperature sensing device. As such, the second temperature sensing is operative to sense the temperature of the liquid in the tube and the first temperature sensing device is inactive and provides no temperature information about the liquid in the tube.

In further accordance with the principles of the present invention, an adapter is provided for electrically coupling a hose having at least first and second temperature sensing devices to a controller compatible with only one of the first and second temperature sensing devices. The adapter includes an adapter cable with first and second ends and a connector. The connector is adapted to selectively mate with only the first temperature sensing device so that the first temperature sensing device is operatively coupled to the adapter cable. The second end of the adapter cable is adapted to electrically couple to the controller such that the first temperature sensing device is electrically active and the second temperature sensing device is electrically inactive.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF DRAWINGS

FIG. 2 is an enlarged partial cross-sectional plan view of the hose of FIG. 1;

FIG. 3 is an enlarged plan view of the adapter shown in FIG. 1;

FIG. 4 is a partial end view of the connector of the wire harness shown in FIG. 2;

FIG. 5 is an end view of a connector at one end of the adapter cable of FIG. 3; and FIG. 6 is an end view of a connector at the other end of the adapter cable of FIG. 3.

DETAILED DESCRIPTION OF PREFERRED EMBODIMENTS

Figure 1:
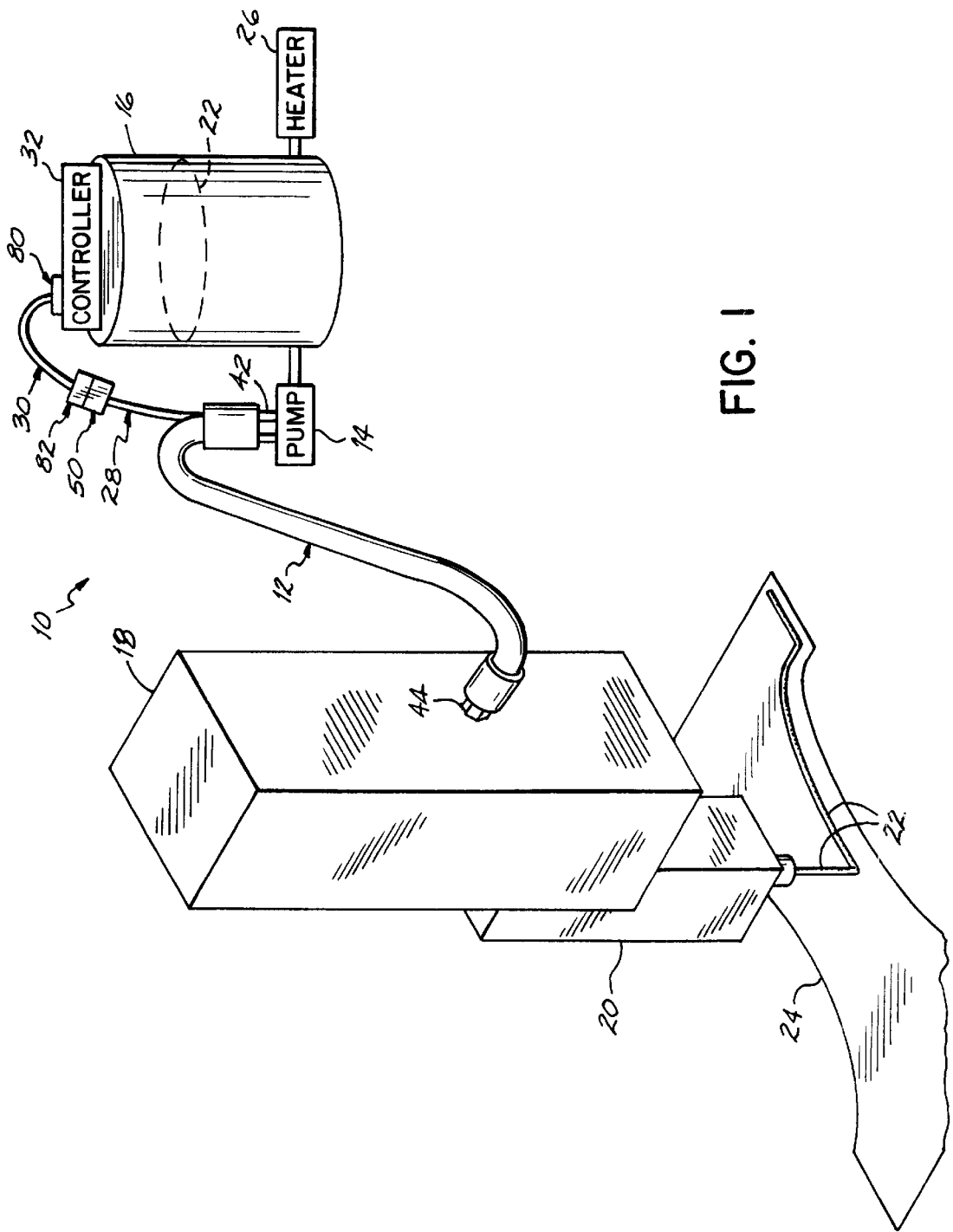
FIG. 1 is a perspective view of the hose of the present invention connecting a supply tank to an adhesive dispensing gun.

With reference to FIG. 1, an adhesive dispensing apparatus 10 includes a hose 12 constructed in accordance with the principals of the present invention. The hose 12 connects a pump 14, which is coupled to supply tank 16, to a manifold 18, which is coupled to an adhesive dispensing gun 20. As such, pump 14 can transport an adhesive 22, such as hot melt, for example, from supply tank 16 via hose 12 to adhesive dispensing gun 20. The adhesive dispensing gun 20 selectively dispenses adhesive 16 onto a substrate 24 such as a nonwoven web used in the construction of a diaper. A heater 26 is associated with supply tank 16 and is selectively controlled to maintain the adhesive 22 within supply tank 16 within a predetermined elevated temperature range. The hose 12 includes an wire harness 28 which is connected by an adapter 30 to a controller 32 which is also associated with the supply tank 16.

With reference to FIG. 2, the hose 12 includes a tube 40 with an inlet end 42 which connects to pump 14 and a discharge end 44 which connects to manifold 18. The tube 40 is advantageously constructed of Teflon™ and is covered end to end by a steel braid cover 46. Steel braid cover 46 is wrapped by at least one layer of tape 47, preferably silicon tape. It is believed that the tape 47 helps to reduce abrasion which might occur if components were otherwise wrapped in direct contact with the steel braid cover 46. The hose 12 further includes a heating device 48 which is wrapped around the steel braid cover 46 along substantially the entire length of the tube 40. One end of the heating device 48 is operatively connected to a connector 50 at the terminal end of wire harness 28. Two temperature sensing devices 52, 54 also wrap around the tube 40 and are operatively connected to connector 50. The temperature sensing devices 52, 54 are preferably resistance temperature detectors (RTD) which sense the temperature of the adhesive 22 flowing through tube 40. Alternatively, one or both of temperature sensing devices 52, 54 could be thermocouples or any other suitable temperature sensing device. Though the RTDs 52, 54 are not to be limited to any particular material, RTD 52 is preferably constructed of nickel and RTD 54 is preferably constructed of platinum. For a given application, only one of the RTDs 52, 54 is operatively connected to controller 32 to monitor the temperature of the adhesive 22 flowing through the tube 40; the other RTD remains inactive. A ground wire 56 electrically connects inlet end 42 and discharge end 44 to connector 50 of wire harness 28.

An insulative tape 58 is wrapped around heating element 48, temperature sensing devices 52, 54, and ground wire 56. Three insulative layers 60, 62, 64 are wrapped around the insulative tape 58 to help reduce heat loss from the heated adhesive 22. Preferably, the insulative layers 60, 62, 64 are constructed of fiberglass. Another layer of tape 66, such as electrical tape, is wrapped around the outside of insulative layer 64. A braided plastic cover 68 covers the electrical tape 66 to provide a protective cover for the outside of the hose 12. Cuffs 70, 72 are placed over the respective inlet and discharge ends 42, 44 to provide additional protection to hose 12 and its electrical components against potentially damaging elements such as water. Preferably, cuffs 70, 72 are made from high temperature plastic.

With reference to FIG. 3, adapter 30 includes an adapter cable 74 which has oppositely disposed connectors 80, 82. Adapter cable 74 includes a plurality of wires 83 which interconnect connector 82 to connector 80. Connector 50 includes a latch 84 (FIG. 2) which operatively engages pins 86, 88 to positively secure connector 50 to connector 82. As shown in FIG. 4, connector 50 includes six electrical connecting members 90, preferably pins, which align with and are inserted into six complementary electrical connecting members 92, preferably ferrules, in connector 82 (FIG. 5). Two of the six electrical pins 90 are connected to the heating element 48; two electrical pins 90 are connect to one RTD 52; and the two electrical pins 90 are connected to the other RTD 54. The ground wire 56 is operatively connected to the connector 50, but not to any of the six electrical pins 90.

Connector 80 includes fifteen electrical connecting members 94, preferably pins, in a 3×5 pattern (FIG. 6) which insert into complementary electrical connecting members (not shown), preferably ferrules, in connector 96 of controller 32. It will be appreciated that the connector 80 may take on several different configurations as dictated by the configuration of the connector 96 of the controller 32. For instance, the connector 96 may be a nine-pin connector instead of the fifteen-pin connector illustrated in FIG. 6. The connector 96 may be round or the controller 32 may not have a connector 96 at all, but instead have a terminal strip in which individual wires 83 of adapter cable 74 are individually connected.

Once the controller 32 is chosen, the adapter 30 can be manufactured such that it will electrically couple only the proper RTD, either 52 or 54, to the controller 32, leaving the other RTD inactive. Although the connector 82 of adapter cable 74 includes six ferrules 92, a typical installation utilizes only four of the six ferrules 92. For example, if a nickel-based controller 32 is chosen, then only the nickel-based RTD 52 gets connected to the controller 32. Accordingly, only the two ferrules 92 associated with the pins 90 connected to the nickel-based RTD 52 are employed. In addition, the two ferrules 92 associated with the heating device 48 are employed. After the connector 82 is properly configured, connector 80 is configured such that the controller 32 is electrically coupled to RTD 52 and heating device 48.

The controller 32 monitors the temperature from only one of the two RTDs 52, 54 and selectively operates the heating element 48. The controller 32 is designed to operate with a specific RTD made of a specific material. For instance, if the controller 32 is designed to operate with a platinum RTD, then the other RTD will be inactive and not used to measure the temperature of the adhesive 22. To monitor the temperature from one RTD and not the other, the connector 80 will be configured so that the controller 32 will be operatively coupled only to the desired RTD. However, if the hose 12 is disconnected from the adhesive dispensing apparatus 10 and installed on a different adhesive dispensing apparatus with a controller designed to operate with a nickel RTD, then the only change will be to the adapter 30. More specifically, a different adapter will be used so that the nickel RTD, previously inactive, will be electrically coupled to the new controller and the platinum RTD will be inactive. As such, the hose 12 can be used on a wide variety of adhesive dispensing apparatus 10 as long as there is a different adapter 30 which is specifically configured to connect to the different controllers. Advantageously, one hose 12 can be used for many different dispensing applications with the need to stock a variety of specifically configured adapter 30. Although hose 12 has been described herein as having multiple insulation and protective layers, the principles of the present invention are equally applicable to any hose construction having a tube and at least two temperature sensing devices operatively associated therewith.

Hose 12 of the present invention provides an inherent safety feature not available in prior heated hoses. A prior heated hose typically includes only one RTD, such as a nickel- or platinum-based RTD, that is matched with an RTD-specific controller. When that heated hose is replaced, the replacement hose must include an RTD of the type in the old heated hose in order that it properly functions with the pre-existing controller. If a heated hose is installed with a different type RTD, the controller will erroneously interpret the temperature signals from the different type RTD, causing the heating device to operate at dangerously high output levels based on the erroneous temperature information.

Hose 12 of the present invention alleviates the above-mentioned safety concern. For example, connector 82 of adapter 30 is specifically configured to connect only one temperature sensing device, for example RTD 52, to the controller 32, leaving the other temperature sensing device or RTD 54 electrically inactive. Thus, when hose 12 is replaced by another hose 12 and all other components remain in place, only RTD 52 in replacement hose 12 will be electrically coupled to controller 32 as connector 82 of pre-existing adapter 30 was already configured to activate only RTD 52, leaving RTD 54 inactive. Thus, by replacing a pre-existing hose 12 with a replacement hose 12, the proper RTD will always be correctly coupled to controller 32 and heating device 48 will not respond to erroneous temperature information provided by controller 32.

In operation, the hose 12 is installed to connect pump 14 and thus supply tank 16 to manifold 18 and ultimately to adhesive dispensing gun 20. The adapter 30 which is specifically designed for the particular controller 32 is then connected between the wire harness 28 and the controller 32. As such, the heating device 48 and one of the RTDs 52, 54 are operatively coupled to the controller 32. The adhesive 22 which is generally in a solid state when at room temperature is then heated by heater 26 to a predetermined elevated temperature range to make the adhesive 22 flowable. Once the adhesive 22 reaches the predetermined elevated temperature range, the pump 18 is activated to selectively pump the adhesive 22 to the adhesive dispensing gun 20 as required by the particular dispensing application. To ensure that the adhesive 22 remains in its liquid condition and at the predetermined elevated temperature range, the active RTD (either 52 or 54) senses the temperature of adhesive 22 in hose 12 and heating device 48 is selectively operated to heat the hose 12. If the dispensing process is stopped and the adhesive dispensing apparatus 10 is shut down, some amount of adhesive 22 may remain in the hose 12. When allowed to cool, the adhesive 22 solidifies and effectively blocks the tube 40. Consequently, when the adhesive dispensing apparatus 10 is put back into operation, the heating device 48 first must be activated to liquify the adhesive 16 in hose 12 to make it flowable again. Depending on the application and the type of adhesive used, the temperature of adhesive 22 is maintained between about 200° to about 500° F. Preferably, the hose 12 is configured to withstand operating pressures up to about 1500 psi.

The hose 12 can be manufactured in a variety of predetermined lengths between 7 and 60 feet, although longer lengths could be accommodated. The tube 40 preferably has an internal diameter of between about $3/8$ inch to about $5/8$ inch. The adapter 30 can be manufactured in a variety of predetermined lengths between 3 and 16 feet, although longer lengths could be accommodated.

Unlike a thermocouple which measures temperature at a particular spot on a surface, an RTD can sense temperature over an predetermined area. To that end, RTDs 52, 54 preferably measure or sense the temperature along an 8 to 10 inch section of the tube 40. The location of this sensing section is dependent on the overall length of the hose 12. For hoses less than or equal to eight feet in length, the sensing section of RTDs 52, 54 is placed approximately 6 inches away from the discharge end 44. For hoses greater than eight feet in length, the sensing section of RTD 52, 54 is placed approximately three feet away from the discharge end 44.

Although hose 12 has been described above as having two temperature sensing devices 52, 54 which are preferably RTDs, the two temperature sensing devices 52, 54 could also be thermocouples or any other suitable temperature sensing device. In fact, the temperature sensing devices 52, 54 need not be of the same type on the same hose 12. In other words, temperature sensing device 52 could be a thermocouple and temperature sensing device 54 could be an RTD. Further, more than two temperature sensing devices could be integrally formed on hose 12 so that any number of RTDs and thermocouples could be part of the same hose 12. Furthermore, although hose 12 is shown having only one wire harness 28 extending therefrom to which RTDs 52, 54 are coupled, hose 12 could include a separate wire harness for each temperature sensing device operatively associated with hose 12. As such, an appropriate adapter 30 would connect to the appropriate wire harness depending on the specific RTD that would be operative or active. The other wire harness would not be used and its associated RTD would be inactive.

While the present invention has been illustrated by a description of various preferred embodiments and while these embodiments have been described in considerable detail in order to describe the best mode of practicing the invention, it is not the intention of applicants to restrict or in any way limit the scope of the appended claims to such detail. Additional advantages and modifications within the spirit and scope of the invention will readily appear to those skilled in the art. The invention itself should only be defined by the appended claims

We claim:

1. A hose for carrying liquid comprising:
    a tube for carrying liquid therethrough, said tube having an inlet end adapted to connect to a source of liquid and a discharge end adapted to connect to a liquid dispensing apparatus;
    first and second temperature sensing devices, each having a different temperature sensing characteristic, operatively associated with said tube to sense the temperature of liquid therein, each of said temperature sensing devices having an output end; and
    an adapter having a first end selectively connected to said output end of said first temperature sensing device and a second end adapted to connect to a controller compatible with said temperature sensing characteristic of said first temperature sensing device and not said temperature sensing characteristic of said second temperature sensing device, said first temperature sensing device connected to said adapter being operative to sense the temperature of the liquid in said tube and said second temperature sensing device not being operatively connected to said adapter so that said second temperature sensing device is inactive and not connected to any controller so that only one of said first and second temperature sensing devices is operative at a time to sense the temperature of the liquid in said tube.

2. The hose of claim 1, wherein said first and second temperature sensing devices are resistance temperature detectors.

3. The hose of claim 2, wherein said first resistance temperature detector is constructed of platinum and said second resistance temperature detector is constructed of nickel.

4. The hose of claim 1, further comprising a wire harness having a connector coupled to said output ends of said temperature sensing devices, said adapter being connected to said connector such that only one of said first and second temperature sensing devices is active while the other temperature sensing device is inactive.

5. The hose of claim 1, further comprising:
    a second adapter capable of replacing said first adapter, said second adapter having a first end selectively connected to said output end of said second temperature sensing device and a second end adapted to connect to a controller compatible with said temperature sensing characteristic of said second temperature sensing device and not said temperature sensing characteristic of said first temperature sensing device, said second temperature sensing device connected to said second adapter being operative to sense the temperature of the liquid in said tube and said first temperature sensing device not being operatively connected to said second adapter so that said first temperature sensing device is inactive.

6. The hose of claim 1, wherein said first temperature sensing device is a resistance temperature detector and said second temperature sensing device is a thermocouple.

7. A hose for carrying liquid comprising:
    a tube for carrying liquid therethrough, said tube having an inlet end adapted to connect to a source of liquid and a discharge end adapted to connect to a liquid dispensing apparatus; and
    first and second temperature sensing devices, each having a different temperature sensing characteristic, operatively associated with said tube to sense the temperature of liquid therein, each of said temperature sensing devices having an output end, said output end of said first temperature sensing device adapted to connect to a first controller compatible with said temperature sensing characteristic of said first temperature sensing device and not said temperature sensing characteristic of said second temperature sensing device, said output end of said second temperature sensing device adapted to connect to a second controller compatible with said temperature sensing characteristic of said second temperature sensing device and not said temperature sensing characteristic of said first temperature sensing device, only one of said first and second temperature sensing devices being operative at a time to sense the temperature of the liquid in said tube and connected to one of said respective first and second controllers.

8. A hose for carrying liquid comprising:
    a tube for carrying liquid therethrough, said tube having an inlet end adapted to connect to a source of liquid and a discharge end adapted to connect to a liquid dispensing apparatus;
    first and second temperature sensing devices, each having a different temperature sensing characteristic, operatively associated with said tube to sense the temperature of liquid therein, each of said temperature sensing devices having an output end, said output end of said first temperature sensing device adapted to connect to a first controller compatible with said temperature sensing characteristic of said first temperature sensing device and not said temperature sensing characteristic of said second temperature sensing device, said output end of said second temperature sensing device adapted to connect to a second controller compatible with said temperature sensing characteristic of said second temperature sensing device and not said temperature sensing characteristic of said first temperature sensing device, only one of said first and second temperature sensing devices being operative at a time to sense the temperature of the liquid in said tube; and
    an adapter having a first end selectively connected to said output end of said first temperature sensing device and a second end adapted to connect to the controller compatible with said temperature sensing characteristic of said first temperature sensing device and not said temperature sensing characteristic of said second temperature sensing device, said first temperature sensing device connected to said adapter being operative to sense the temperature of the liquid in said tube and said second temperature sensing device not being operatively connected to said adapter so that said second temperature sensing device is inactive and not connected to any controller.

* * * * *